United States Patent
Gilges

(10) Patent No.: US 10,801,599 B2
(45) Date of Patent: Oct. 13, 2020

(54) STRAIN WAVE GEAR

(71) Applicant: OVALO GmbH, Limburg (DE)

(72) Inventor: Siegmar Gilges, Bad Schwalbach (DE)

(73) Assignee: OVALO GmbH, Limburg (DE)

( * ) Notice: Subject to any disclaimer, the term of this patent is extended or adjusted under 35 U.S.C. 154(b) by 685 days.

(21) Appl. No.: 15/473,055

(22) Filed: Mar. 29, 2017

(65) Prior Publication Data

US 2017/0284527 A1    Oct. 5, 2017

(30) Foreign Application Priority Data

Mar. 30, 2016    (LU) .......................................... 93010

(51) Int. Cl.
*F16H 49/00*    (2006.01)
*F16C 19/08*    (2006.01)

(52) U.S. Cl.
CPC ........... *F16H 49/001* (2013.01); *F16C 19/08* (2013.01); *F16C 2361/61* (2013.01); *F16C 2370/00* (2013.01)

(58) Field of Classification Search
CPC ............. F16H 49/001; F16H 2049/003; F16H 57/0025
USPC ........................................................ 74/640
See application file for complete search history.

(56) References Cited

U.S. PATENT DOCUMENTS

| | | | | |
|---|---|---|---|---|
| 3,091,979 A | * | 6/1963 | Jennings | ............... F16H 49/001 74/640 |
| 3,469,463 A | * | 9/1969 | Ishikawa | ................. F16H 13/00 74/640 |
| 4,601,216 A | * | 7/1986 | Inoue | ..................... F16H 49/001 74/640 |
| 4,909,098 A | | 3/1990 | Kiryu | |
| 4,974,470 A | * | 12/1990 | Ishikawa | ............... F16H 49/001 74/640 |
| 6,263,997 B1 | * | 7/2001 | Breuning | ................. B62D 1/12 180/315 |
| 6,893,371 B2 | * | 5/2005 | Mills | ....................... F16H 61/32 475/149 |

(Continued)

FOREIGN PATENT DOCUMENTS

DE    102011004074    8/2012
EP    2184514    5/2010

(Continued)

*Primary Examiner* — Ha Dinh Ho

(74) *Attorney, Agent, or Firm* — Hodgson Russ LLP

(57) ABSTRACT

A strain wave gear has a wave generator rotatably mounted in a radially flexible sleeve having external toothing, a first rigid hollow wheel with internal toothing meshing with the external toothing of the radially flexible sleeve, and a second rigid hollow wheel with internal toothing meshing with the external toothing of the radially flexible sleeve. The wave generator is mounted by exactly one radially flexible roller bearing so as to be rotatable relative to the radially flexible sleeve. The roller bearing has a first rolling-element row, having first rolling elements, and at least one second rolling-element row, having second rolling elements, that is axially offset from the first rolling-element row. The roller bearing has an external ring with which the first and second rolling elements are in direct contact, and/or an internal ring with which the first and second rolling elements are in direct contact.

22 Claims, 3 Drawing Sheets

(56) References Cited

U.S. PATENT DOCUMENTS

2011/0088496 A1* 4/2011 Cho ................. F16H 49/001
                                                  74/411
2015/0049975 A1   2/2015 Lee

FOREIGN PATENT DOCUMENTS

SU        1525367     11/1989
WO        2009157607  12/2009

* cited by examiner

STRAIN WAVE GEAR

CROSS-REFERENCE TO RELATED APPLICATIONS

This application claims priority of Luxembourgian patent application number 93010 filed Mar. 30, 2016, the entire disclosure of which is incorporated by reference herein.

FIELD OF THE INVENTION

The invention relates to a strain wave gear having a wave generator which is rotatably mounted in a radially flexible sleeve with external toothing, and having a first rigid hollow wheel with internal toothing, the toothing of the latter meshing with the external toothing of the radially flexible sleeve with external toothing, and having a second rigid hollow wheel with internal toothing, the toothing of the latter likewise meshing with the external toothing of the radially flexible sleeve with external toothing.

BACKGROUND OF THE INVENTION

A strain wave gear of this type is known for example from EP 2 184 514 B1. This patent document specifically discloses a strain wave gear having a wave generator for producing a rotating movement and a flexspline, at least one component which transmits the rotating movement of the wave generator to the flexspline engaging on the internal circumference or the external circumference of said flexspline, wherein the flexspline by way of the external circumference or the internal circumference thereof engages on a circular spline and on a dynamic spline. The circular spline and the dynamic spline each are configured as a hollow ring, the flexspline engaging in each case on the internal circumference of said hollow ring by those portions which in each case are deformed by the wave generator in a radially outward manner. A rotating movement of the flexspline and simultaneously a rotating movement of the rigid transmission element are caused by the wave movement of the wave generator.

SUMMARY OF THE INVENTION

It is thus the object of the present invention to provide a strain wave gear which, with an engineering design of simple construction, functions in a more reliable manner.

The object is achieved by a strain wave gear which is distinguished in that the wave generator by means of a single radially flexible roller bearing is mounted so as to be rotatable relative to the radially flexible sleeve with external toothing, said radially flexible roller bearing having a first rolling-element row, having first rolling elements, and at least one second rolling-element row, having second rolling elements, that is axially offset in relation to the first rolling-element row, wherein
  a. the roller bearing has an external ring with which the first rolling elements of the first rolling-element row and the second rolling elements of the second rolling-element row are in direct contact, and/or wherein
  b. the roller bearing has an internal ring with which the first rolling elements of the first rolling-element row and the second rolling elements of the second rolling-element row are in direct contact.

According to the invention it has been acknowledged that meshing errors or even so-called tooth jumping of one of the two hollow wheels relative to the toothing of the radially flexible sleeve can arise in the case of a strain wave gear of the type mentioned at the outset, in the case of which an axial end of the radially flexible sleeve deflects in a radially inward manner in particular in the case of heavy instantaneous stress. In particular, it can arise in the case of a so-called annular gear in which the radially flexible sleeve is configured as a cylindrical ring that both axial ends of the radially flexible sleeve deflect in a radially inward manner such that meshing errors and/or increased noise generation and/or even tooth jumping can arise in these regions.

In the case of a strain wave gear according to the invention, this disadvantageous effect can advantageously be avoided in that the first hollow wheel is supported on the wave generator, preferably substantially and primarily, by way of the radially flexible sleeve with external toothing and of the first rolling elements of the first rolling-element row of the roller bearing, and/or in that the axial part region of the radially flexible sleeve that meshes with the first hollow wheel is supported on the wave generator, preferably substantially and primarily, by way of the first rolling elements of the first rolling-element row of the roller bearing. Alternatively or additionally, it can advantageously be provided in an analogous manner that the second hollow wheel is supported on the wave generator, in particular substantially and primarily, by way of the radially flexible sleeve with external toothing and of the second rolling elements of the second rolling-element row of the roller bearing, and/or in that the axial part region of the radially flexible sleeve that meshes with the second hollow wheel is supported on the wave generator, preferably substantially and primarily, by way of the second rolling elements of the second rolling-element row of the roller bearing. The aforementioned embodiments have the very particular technical effect of the radially flexible sleeve across the entire width thereof, or at least across the width of the toothing thereof, being supported in such a secure and reliable manner that no radial deflection can arise. To this extent, meshing errors, in particular a disturbing noise generation by virtue of meshing errors, are/is effectively avoided, respectively.

As opposed to the use of two individual and separate roller bearings which are disposed so as to be mutually parallel, the use of a single roller bearing having two rolling-element rows, as proposed according to the invention, has the very particular advantage that a relative movement of individual and separate roller bearings, in particular a relative movement of the external rings of separate roller bearings, as can arise in the case of high stress, is precluded. Rather, it is advantageously guaranteed in the case of the present invention that the radially flexible sleeve in the region of both hollow wheels, in particular by way of the external ring that is common to both rolling-element rows, and/or of the internal ring that is common to both rolling-element rows, is particularly well supported, because the individual rolling-element rows are coupled by way of the at least one component and thus cannot move axially relative to one another or it if at all can move only to an insubstantial extent.

In particular, it can be advantageously provided that the external ring has in each case one dedicated external guide groove for the rolling elements of each rolling-element row.

In particular, it can be advantageously provided that the internal ring has in each case one dedicated internal guide groove for the rolling elements of each rolling-element row.

Alternatively or additionally, a common rolling element cage, in particular a ball cage, can also be present, the first rolling elements of the first rolling-element row and the second rolling elements of the second rolling-element row being in direct contact with said common rolling element cage.

According to the invention, the wave generator by means of a single radially flexible roller bearing is mounted so as to be rotatable relative to the radially flexible sleeve with external toothing, said single radially flexible roller bearing having a first rolling-element row, having first rolling elements, and at least one second rolling-element row, having second rolling elements, that is axially offset in relation to the first rolling-element row.

In the case of a very particularly advantageous embodiment which guarantees particularly positive support of the radially flexible sleeve, the first rolling elements of the first rolling-element row of the roller bearing are disposed in a first cross-sectional plane that is perpendicular to the axial direction of the strain wave gear and in which the first hollow wheel is also disposed. Alternatively or additionally, it can be advantageously provided that the second rolling elements of the second rolling-element row of the roller bearing are disposed in a second cross-sectional plane that is perpendicular to the axial direction of the strain wave gear and in which the second hollow wheel is also disposed. In this way, it is advantageously guaranteed that the first hollow wheel and the axially associated part of the sleeve are predominantly supported by way of the rolling elements of the first rolling-element row, while the second hollow wheel and the associated part of the radially flexible sleeve with which the second hollow wheel meshes is predominantly supported by way of the second rolling elements of the second rolling-element row.

The first hollow wheel and the second hollow wheel are preferably disposed so as to be mutually parallel and/or mutually coaxial. A bearing, in particular a friction bearing, which guarantees that the hollow wheels can rotate in an unimpeded manner in relation to one another can be present between the hollow wheels.

In particular, it can be provided that the toothing of the first hollow wheel has a first tooth count which is greater than the tooth count of the toothing of the second hollow wheel. It can be provided herein in particular that one of the two hollow wheels has the same tooth count as the sleeve with external toothing. However, it is also possible for the both hollow wheels to have a tooth count that differs from that of the toothing of the radially flexible sleeve.

In one particularly advantageous embodiment, the number of the first rolling elements of the first rolling-element row is chosen so as to depend on the tooth count of the first hollow wheel.

It has been demonstrated that an embodiment in which the number of the first rolling elements of the first rolling-element row is in the range from 16 to 25 is particularly advantageous. The number of the second rolling elements of the second rolling-element row can advantageously also be in the range from 16 to 25.

Alternatively or additionally, it can also be provided in an analogous manner that the number of the second rolling elements of the second rolling-element row is greater than one fifth of the tooth count of the second hollow wheel, in particular greater than one third of the tooth count of the second hollow wheel. Alternatively, it is also possible for the number of the first rolling elements of the first rolling-element row to be of exactly the same magnitude as the number of the second rolling elements of the second rolling-element row.

In the case of one particularly advantageous embodiment, the number of the first rolling elements of the first rolling-element row differs from the number of rolling elements of the second rolling-element row. In particular, it can be advantageously provided that the number of the first rolling elements of the first rolling-element row is greater than the number of the second rolling elements of the second rolling-element row. In the case of one particular embodiment, the number of the first rolling elements of the first rolling-element row is greater than the number of the second rolling elements of a second rolling-element row by exactly one. These embodiments with dissimilar numbers of rolling elements in the individual rolling-element rows have the very particular advantage that the position of the rolling elements of the first rolling-element row relative to the rolling elements of the second rolling-element row varies continually. Relative mutual positions of the rolling elements of the roller bearings of the individual rolling-element rows that are unfavorable in particular in terms of a stressed situation arise briefly and temporarily, if at all. Moreover, consistent wear is achieved in this way.

Preferably at least one roller bearing cage, in particular a ball cage, which guarantees that the rolling elements of the individual rolling-element rows in the tangential direction remain so as to be spaced apart in an equidistant manner is present. It can be advantageously provided herein that one dedicated ball cage (rolling element cage) is present for each rolling-element row. These rolling element cages can be configured in particular as snap cages. In particular, such a snap cage can be plug-fitted axially from the outside. Alternatively, it is also possible for one common rolling element cage, in particular a ball cage, to be present for the rolling elements of both rolling-element rows.

The rolling elements can be configured in particular as balls. However, it is also possible for the rolling elements to be configured as needles, for example.

In the case of a particularly advantageous embodiment, the number of the rolling elements of the first rolling-element row is even. It is also possible for the number of the second rolling elements of the second rolling-element row to be even.

In the case of one particular embodiment, the number of the first rolling elements of the first rolling-element row is even, while the number of the second rolling elements of the second rolling-element row is odd. In particular in the case of such an embodiment it is advantageously guaranteed that the relative position of the individual rolling elements of the individual rolling-element rows changes continually. To this extent, it can alternatively also be provided that the number of the first rolling elements of the first rolling-element row is odd, while the number of the second rolling elements of the second rolling-element row is even.

In the case of a particularly stable embodiment, the roller bearing has at least one third rolling-element row having third rolling elements. Such an embodiment can be expedient, for example, when one of the hollow wheels is configured so as to be wider than the other hollow wheel. The wider hollow wheel and the associated axial proportion of the radially flexible sleeve that is operatively connected to the wider hollow wheel herein can be preferably supported by way of the rolling elements of two rolling-element rows, while the narrower hollow wheel and the axially associated proportion of the radially flexible sleeve that meshes with the other hollow wheel is supported by way of the rolling elements of the third rolling-element row.

In the case of one particular embodiment, it is provided that both the first hollow wheel with the axially associated proportion of the radially flexible sleeve thereof, as well as the second hollow wheel with the axially associated proportion of the radially flexible sleeve thereof, are in each case supported by way of the rolling elements of two rolling-element rows such that the roller bearing has a total of four rolling-element rows. In particular, it can also be advantageously provided herein that the individual rolling-element rows have mutually dissimilar numbers of rolling elements.

In the case of one particularly advantageous embodiment, the first rolling elements are disposed so as to be tangentially offset to the second rolling elements. A particularly good support of the radially flexible sleeve is achieved in this way. In particular, it can be advantageously provided that the rolling elements of neighboring rolling-element rows in the tangential direction are offset by a spacing Z=D/A, wherein D is the tangential diameter of a rolling element, and A is the total number of rolling element tracks. A particularly uniform distribution of the rolling elements is achieved in this way.

In the case of one advantageous embodiment, the roller bearing has an external ring having in each case one guide groove for the rolling elements of each rolling-element row. Moreover, the roller bearing in the case of this embodiment additionally has an internal ring having in each case one guide groove for the rolling elements of each rolling-element row.

The external ring is a component that is separate from the radially flexible sleeve and/or is produced separately therefrom. In particular, the external ring is not conjointly produced so as to be integral to the radially flexible sleeve or to be a component part of the latter. The internal ring is a component that is separate from the wave generator and/or is produced separately therefrom. In particular, the internal ring is not conjointly produced so as to be integral to the wave generator or to be a component part of the latter.

An embodiment in which the roller bearing has the external ring, in particular with in each case one external guide groove for the rolling elements of each rolling-element row, and in which the roller bearing has no internal ring, but an external circumferential face of the wave generator has in each case one internal guide groove for the rolling elements of each rolling-element row, is particularly compact and robust. Alternatively, it can also be provided that the roller bearing has an internal ring having in each case one internal guide groove for the rolling elements of each rolling-element row, while no external ring is present, but an internal circumferential face of the radially flexible sleeve has in each case one internal guide groove for the rolling elements of each rolling-element row.

A particularly secure support of the hollow wheels and of the radially flexible sleeve is achieved in the case of an embodiment in which the axial width of the roller bearing is greater than the sum of the axial widths of the first and of the second hollow wheel. Alternatively or additionally, it can be advantageously provided that the axial width of the roller bearing is greater than the sum of the axial widths of the toothings of the first and of the second hollow wheel, or that the axial width of the roller bearing is greater than the sum of the axial widths of those proportions of the toothings of the first and of the second hollow wheel that mesh with the toothing of the radially flexible sleeve.

A steering actuator which is equipped with a strain wave gear according to the invention is particularly safe and reliable. The steering actuator can serve in particular for superimposing the steering movements which the driver performs in a motor vehicle with additional steering movements.

An internal combustion engine which is equipped with an actuator which includes a strain wave gear according to the invention is particularly reliable. The actuator can serve as a cam shaft adjustment unit, for example, or as an actuator for adjusting an expansion stroke or the size of a combustion chamber. An actuator for driving an adjustment shaft for adjusting the expansion stroke and/or the compression ratio of an internal combustion engine is particularly advantageous, wherein the actuator has a drive motor and a strain wave gear according to the invention that is disposed downstream of the drive motor. In particular, it can be advantageously provided herein that a coupling that is radially flexible and/or flexural transversely to the axial direction, on the one hand, and is torsionally rigid, on the other hand, is connected to the take-off side of the gear.

The application of a strain wave gear according to the invention is particularly advantageous in a running gear actuator. The running gear actuator can in particular be part of an active running gear and serve for preventing or minimizing rolling and/or pitching movements of a vehicle.

In particular, it is generally advantageous for a strain wave gear according to the invention to be applied in a vehicle, in particular a motor vehicle.

BRIEF DESCRIPTION OF THE DRAWING VIEWS

The subject matter of the invention is schematically illustrated in an exemplary manner in the drawing and will be described hereunder by means of the figures, wherein identical elements or elements with identical functions are in most instances provided with identical reference signs. In the drawing.

DETAILED DESCRIPTION OF THE INVENTION

Figure 1:
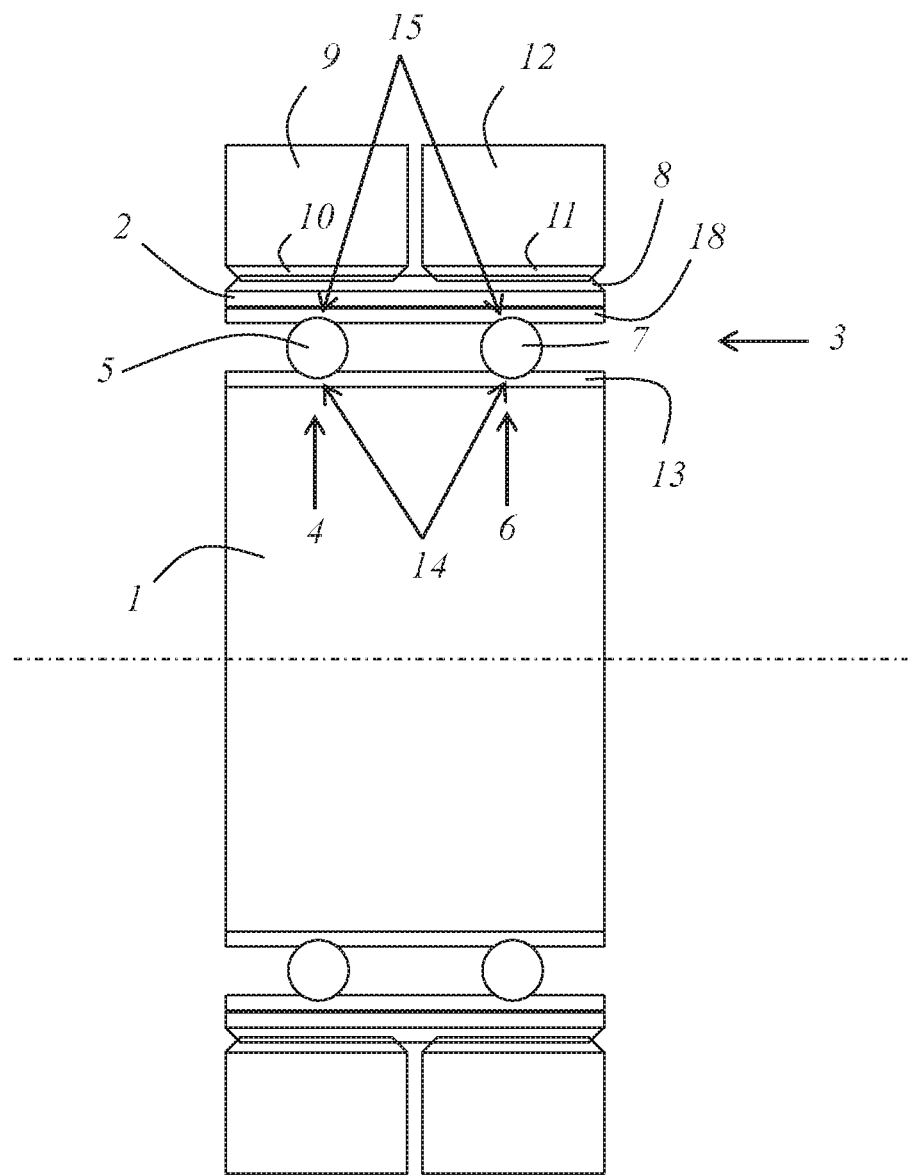
FIG. 1 shows an exemplary embodiment of a strain wave gear according to the invention in cross-section.

FIG. 1 shows an exemplary embodiment of a strain wave gear according to the invention, said strain wave gear having a wave generator 1 which is rotatably mounted in a radially flexible sleeve 2 having external toothing 8. Specifically, the wave generator 1 by means of a radially flexible roller bearing 3 is mounted so as to be rotatable relative to the radially flexible sleeve 2 having external toothing 8, wherein the roller bearing has a first rolling-element row 4, having first rolling elements 5, and a second rolling-element row 6, having second rolling elements 7, said second rolling-element row 6 being axially spaced apart from the first rolling-element row 4. The external toothing 8 of the radially flexible sleeve 2 at two mutually opposite meshing locations, which during operation revolve and lie in the plane of the major vertical axis of the elliptically configured wave generator 1, meshes with a first rigid hollow wheel 9 having internal toothing. Moreover, the external toothing 8, likewise at two mutually opposite locations that revolve during operation, meshes with the internal toothing 11 of a second hollow wheel 12.

The radially flexible roller bearing 3 as that component that is in direct contact with the first rolling elements 5 of the first rolling-element row 4 and with the second rolling elements 7 of the second rolling-element row 6 has an internal ring 13, and as a further component that is in direct contact with the first rolling elements 5 of the first rolling-element row 4 and with the second rolling elements 7 of the second rolling-element row 6 has an external ring 18. The internal ring 13 has two encircling guide grooves 14 for the rolling elements 5, 7 of the two rolling-element rows 4, 6. In an analogous manner, the external ring 18 likewise has two encircling grooves 15 for the rolling elements 5, 7 of the two rolling-element rows 4, 6.

Figure 2:
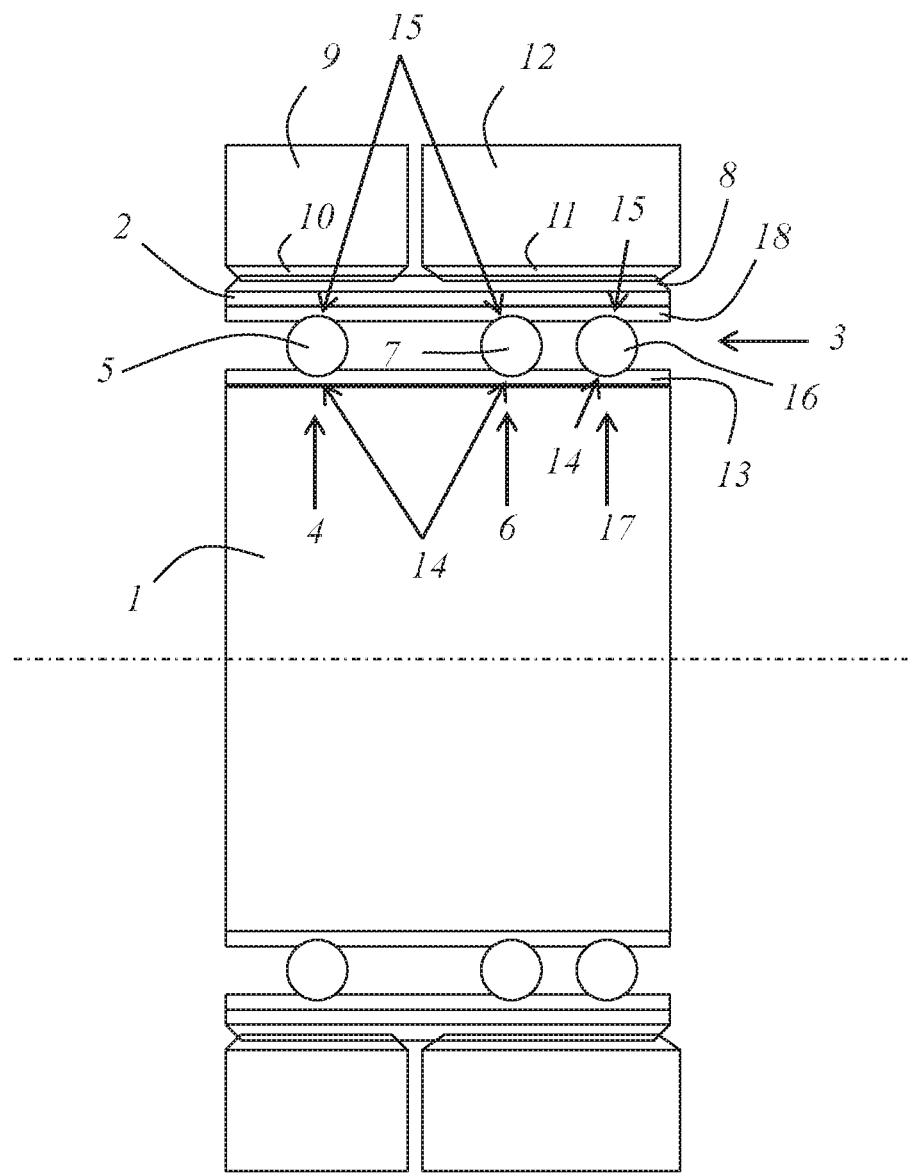
FIG. 2 shows another exemplary embodiment of a strain wave gear according to the invention in cross-section.

FIG. 2 shows another exemplary embodiment of a strain wave gear according to the invention, in which the first hollow wheel 9 is configured so as to be axially narrower than the second hollow wheel 12. In the case of this embodiment the second hollow wheel 12 is supported by way of the rolling elements 7 of a second rolling-element row 6 and additionally by way of the third rolling elements 16 of a third rolling-element row 17 of the roller bearing 3. In the case of this embodiment the radially flexible roller bearing 3 as that component that is in direct contact with the first rolling elements 5 of the first rolling-element row 4 and with the second rolling elements 7 of the second rolling-element row 6 and with the third rolling elements 16 of the third rolling-element row 17 has an internal ring having three encircling guide grooves 14 for the rolling elements 5, 7, 16 of the individual rolling-element rows 4, 6, 17. In an analogous manner, the external ring 18 that functions as a further component that is in direct contact with the first rolling elements 5 of the first rolling-element row 4 and with the second rolling elements 7 of the second rolling-element row 6 and with the third rolling elements 16 of the third rolling-element row 17 likewise has three encircling guide grooves 15 for the rolling elements 5, 7, 16.

Figure 3:
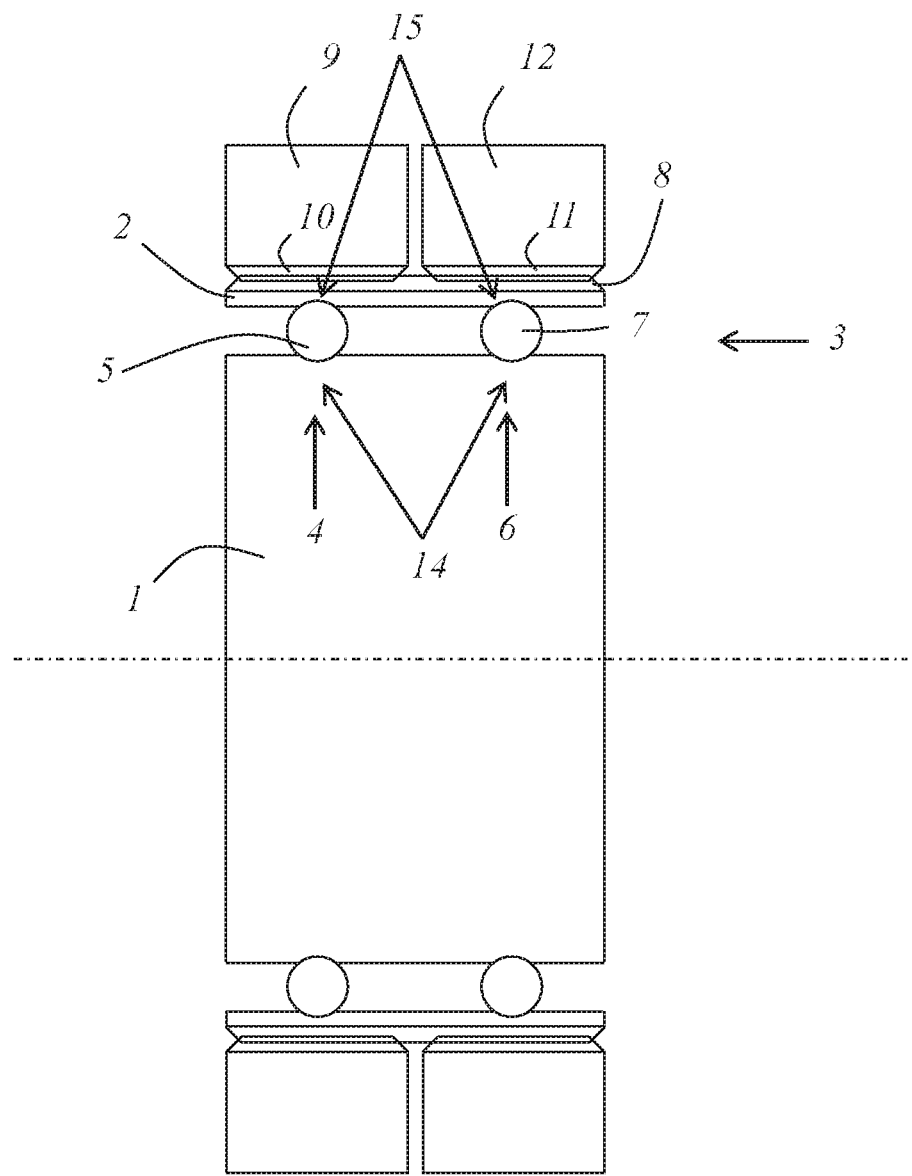
FIG. 3 shows a third exemplary embodiment of a strain wave gear according to the invention in cross-section.

FIG. 3 shows a third exemplary embodiment in which the roller bearing 3 is formed by way of the rolling elements 5, 7 of the plurality of rolling-element rows 4, 6, and by way of the radially flexible sleeve 2 which on the internal circumferential face thereof has in each case one guide groove 15 for the rolling elements of each rolling-element row 4, 6, and by way of the wave generator 1 which on the external circumferential face thereof has in each case one guide groove 14 for the rolling elements 5, 7 of each rolling-element row. No internal ring 13 and no external ring 18 is present in the case of this embodiment. In the case of this exemplary embodiment, the wave generator 1 and the radially flexible sleeve 2 function as components that are in direct contact with the first rolling elements 5 of the first rolling-element row 4 and with the second rolling elements 7 of the second rolling-element row 6.

LIST OF REFERENCE SIGNS

1 Wave generator
2 Sleeve
3 Roller bearing
4 First rolling-element row
5 First rolling elements
6 Second rolling-element row
7 Second rolling elements
8 External toothing of sleeve 2
9 First hollow wheel
10 Internal toothing of first hollow wheel 9
11 Internal toothing of second hollow wheel 12
12 Second hollow wheel
13 Internal ring
14 Guide grooves
15 Guide grooves
16 Third rolling elements
17 Third rolling-element row
18 External ring

What is claimed is:

1. A strain wave gear having a wave generator which is rotatably mounted in a radially flexible sleeve having external toothing, and having a first rigid hollow wheel with internal toothing, the internal toothing of the first rigid hollow wheel meshing with the external toothing of the radially flexible sleeve, and having a second rigid hollow wheel with internal toothing, the internal toothing of the second rigid hollow wheel meshing with the external toothing of the radially flexible sleeve, wherein the wave generator by means of a single radially flexible roller bearing is mounted so as to be rotatable relative to the radially flexible sleeve, said radially flexible roller bearing having a first rolling-element row having first rolling elements, and a second rolling-element row having second rolling elements, the second rolling-element row being axially offset in relation to the first rolling-element row, wherein
 a. the roller bearing has an external ring with which the first rolling elements of the first rolling-element row and the second rolling elements of the second rolling-element row are in direct contact, and/or wherein
 b. the roller bearing has an internal ring with which the first rolling elements of the first rolling-element row and the second rolling elements of the second rolling-element row are in direct contact.

2. The strain wave gear as claimed in claim 1, wherein the external ring has a dedicated external guide groove for the rolling elements of each rolling-element row.

3. The strain wave gear as claimed in claim 1, wherein the internal ring has a dedicated internal guide groove for the rolling elements of each rolling-element row.

4. The strain wave gear as claimed in claim 1, wherein the first rolling elements and the second rolling elements are in direct contact with a common rolling element cage.

5. The strain wave gear as claimed in claim 1, wherein
 a. the first rolling elements are configured and disposed so as to be spatially separate and independent of the second rolling elements, and/or
 b. the first rolling elements are rotatable independently of the second rolling elements, and/or
 c. none of the first rolling elements is connected to one of the second rolling elements in a rotationally fixed manner.

6. The strain wave gear as claimed in claim 1, wherein
 a. the first rigid hollow wheel is supported on the wave generator by the radially flexible sleeve and the first rolling elements of the first rolling-element row of the roller bearing, and/or
 b. the second rigid hollow wheel is supported on the wave generator by the radially flexible sleeve and the second rolling elements of the second rolling-element row of the roller bearing, and/or
 c. the axial part region of the sleeve that meshes with the first rigid hollow wheel is supported on the wave generator by the first rolling elements of the first rolling-element row of the roller bearing, and/or
 d. the axial part region of the sleeve that meshes with the second rigid hollow wheel is supported on the wave generator by the second rolling elements of the second rolling-element row of the roller bearing.

7. The strain wave gear as claimed in claim 1, wherein the first rolling elements of the first rolling-element row of the roller bearing are disposed in a first cross-sectional plane that is perpendicular to an axial direction of the strain wave gear and in which the first rigid hollow wheel is also disposed, and/or wherein the second rolling elements of the second rolling-element row of the roller bearing are disposed in a second cross-sectional plane that is perpendicular to the axial direction and in which the second rigid hollow wheel is also disposed.

8. The strain wave gear as claimed in claim 1, wherein the first rigid hollow wheel and the second rigid hollow wheel are mutually parallel and/or mutually coaxial.

9. The strain wave gear as claimed in claim 1, wherein the toothing of the first rigid hollow wheel has a first tooth count which is greater than a tooth count of the toothing of the second rigid hollow wheel.

10. The strain wave gear as claimed in claim 1, wherein
   a. the first rolling-element row includes 16 to 25 rolling elements, and/or
   b. the second rolling-element row includes 16 to 25 rolling elements.

11. The strain wave gear as claimed in claim 1, wherein
   a. the number of the first rolling elements of the first rolling-element row differs from the number of the second rolling elements of the second rolling-element row, or
   b. the number of the first rolling elements of the first rolling-element row is greater that the number of the second rolling elements of the second rolling-element row, or
   c. the number of the first rolling elements of the first rolling-element row is greater than the number of the second rolling elements of the second rolling-element row by exactly 1.

12. The strain wave gear as claimed in claim 1, wherein
   a. the number of the first rolling elements of the first rolling-element row is even, or
   b. the number of the second rolling elements of the second rolling-element row is even, or
   c. the number of the first rolling elements of the first rolling-element row is even, while the number of the second rolling elements of the second rolling-element row is odd, or
   d. the number of the first rolling elements of the first rolling-element row is odd, while the number of the second rolling elements of the second rolling-element row is even.

13. The strain wave gear as claimed in claim 1, wherein the roller bearing has at least one third rolling-element row having third rolling elements.

14. The strain wave gear as claimed in claim 1, wherein
   a. the first rolling elements are disposed so as to be tangentially offset to the second rolling elements, and/or
   b. the rolling elements of neighboring rolling-element rows in the tangential direction are offset by a spacing $z=D/A$, wherein D is the tangential diameter of a rolling element and A is the total number of rolling element tracks.

15. The strain wave gear as claimed in claim 1, wherein
   a. the roller bearing has the external ring but not the internal ring, but an external circumferential face of the wave generator has an internal guide groove for the rolling elements of each rolling-element row, or
   b. the roller bearing has the internal ring but not the external ring, but an internal circumferential face of the radially flexible sleeve has an external guide grove for the rolling elements of each rolling-element row.

16. The strain wave gear as claimed in claim 1, wherein
   a. the axial width of the roller bearing is greater than the sum of the axial widths of the first rigid hollow wheel and the second rigid hollow wheel, or
   b. the axial width of the roller bearing is greater than the sum of the axial widths of the toothings of the first rigid hollow wheel and the second hollow wheel, or
   c. the axial width of the roller bearing is greater than the sum of the axial widths of those proportions of the toothings of the first rigid hollow wheel and of the second rigid hollow wheel that mesh with the toothing of the radially flexible sleeve, or
   d. the axial width of the roller bearing is greater than the axial width of the first rigid hollow wheel, and/or
   e. the axial width of the roller bearing is greater than the axial width of the second rigid hollow wheel.

17. An actuator comprising a strain wave gear as claimed in claim 1.

18. The actuator as claimed in claim 17, wherein
   a. the actuator is a steering actuator, or
   b. the actuator is configured for driving an adjustment shaft for adjusting the expansion stroke and/or the compression ratio of an internal combustion engine, or
   c. the actuator is configured as a cam shaft adjustment unit, or
   d. the actuator is configured as a running gear actuator.

19. A motor vehicle comprising a strain wave gear as claimed in claim 1.

20. The motor vehicle as claimed in claim 19, wherein the motor vehicle comprises an internal combustion engine having an actuator, and the strain wave gear is part of the actuator.

21. The motor vehicle as claimed in claim 19, wherein the motor vehicle comprises a running gear having a running gear actuator, and the strain wave gear is part of the running gear actuator.

22. The motor vehicle as claimed in claim 19, wherein the motor vehicle comprises a steering assembly, and the strain wave gear is part of the steering assembly.

* * * * *